(12) United States Patent
Baiker et al.

(10) Patent No.: US 7,825,802 B2
(45) Date of Patent: Nov. 2, 2010

(54) IDENTIFICATION SYSTEM AND METHOD OF DETERMINING MOTION INFORMATION

(75) Inventors: Stefan Baiker, Basel (CH); Martin Ruhl, Bottmingen (CH)

(73) Assignee: Schweizerische Bundesbahnen SBB, Bern (CH)

( * ) Notice: Subject to any disclaimer, the term of this patent is extended or adjusted under 35 U.S.C. 154(b) by 1244 days.

(21) Appl. No.: 11/368,542

(22) Filed: Mar. 7, 2006

(65) Prior Publication Data
US 2006/0197939 A1 Sep. 7, 2006

(51) Int. Cl.
*G08B 13/14* (2006.01)
(52) U.S. Cl. .............. 340/572.1; 340/10.4; 340/825.49; 340/505; 340/572.2; 340/10.32; 340/10.1; 340/10.3; 340/572.4; 340/572.7; 342/42; 342/44; 342/51; 343/748; 343/764; 343/788; 343/855; 343/866
(58) Field of Classification Search ................. 340/10.1, 340/10.3, 10.4, 505, 572.4, 572.7, 825.49; 343/748, 764, 788, 855, 866, 728; 342/42, 342/44, 51
See application file for complete search history.

(56) References Cited

U.S. PATENT DOCUMENTS

| | | | |
|---|---|---|---|
| 4,107,678 A * | 8/1978 | Powell .......................... 342/62 |
| 5,012,236 A | 4/1991 | Troyk et al. |
| 5,084,699 A | 1/1992 | DeMichele |
| 5,095,309 A | 3/1992 | Troyk et al. |
| 5,129,605 A | 7/1992 | Burns et al. |
| 5,198,807 A | 3/1993 | Troyk et al. |
| 5,333,820 A | 8/1994 | Gilcher |
| 6,046,683 A * | 4/2000 | Pidwerbetsky et al. ..... 340/10.4 |
| 6,366,260 B1 | 4/2002 | Carrender |
| 6,371,417 B1 | 4/2002 | Southon |
| 6,839,035 B1 * | 1/2005 | Addonisio et al. .......... 343/742 |
| 7,298,264 B1 * | 11/2007 | Kuzma et al. ............ 340/572.1 |
| 2004/0246104 A1 | 12/2004 | Baechtiger et al. |

FOREIGN PATENT DOCUMENTS

| | | |
|---|---|---|
| EP | 1 017 577 B1 | 11/2002 |
| EP | 1 408 207 A1 | 4/2004 |
| WO | WO 99/11497 | 3/1999 |

OTHER PUBLICATIONS

Klaus Finkenzeller, RFID-Handbook, 3rd Edition, Carl Hanser Verlag, p. 1 (2002).
Philips, Tagsys, Texas Instruments Inc., White Paper, Item-Level Visibility in the Pharmaceutical Supply Chain, White Paper (Jul. 2004).

* cited by examiner

*Primary Examiner*—George A Bugg
*Assistant Examiner*—Ojiako Nwugo
(74) *Attorney, Agent, or Firm*—Oliff & Berridge, PLC

(57) ABSTRACT

An identification system which may be employed in a transport or monitoring system has at least one stationary and at least one mobile transmission unit which are each provided with an antenna, which antennas in turn are coupled inductively or capacitively to each other during the transmission of data. At least one of the antennas is designed such that in response to a mutual displacement of the coupled antennas a direction-dependent modulation of the transmitted signals occurs which is demodulated and evaluated in at least one of the transmission units, for example, by a demodulation unit and a processor, optionally a signal processor, in order to obtain information relating to the relative motion of the two transmission units. In addition to known identification functions, the identification system may perform additional important functions without requiring any significant additional expense.

12 Claims, 9 Drawing Sheets

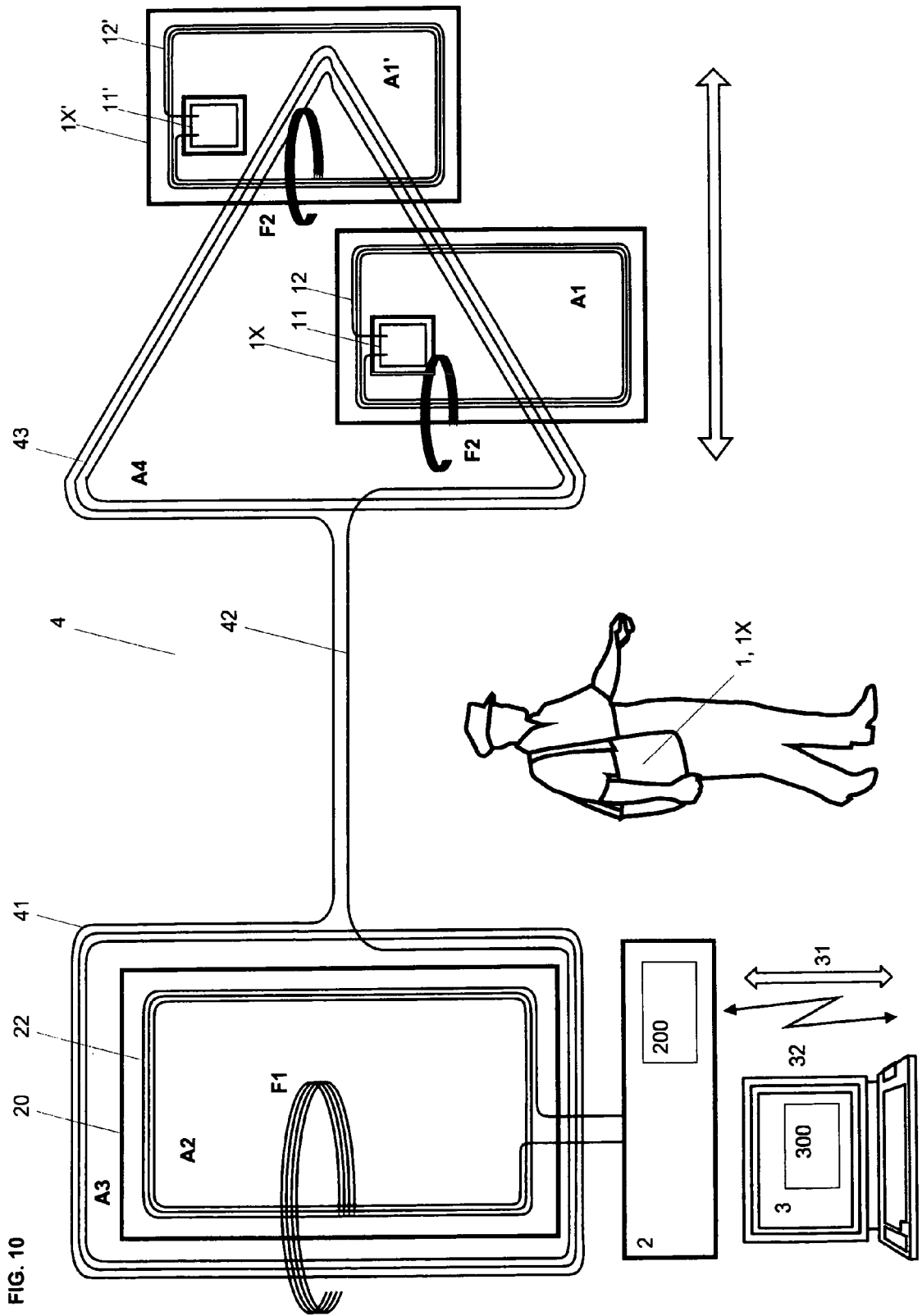

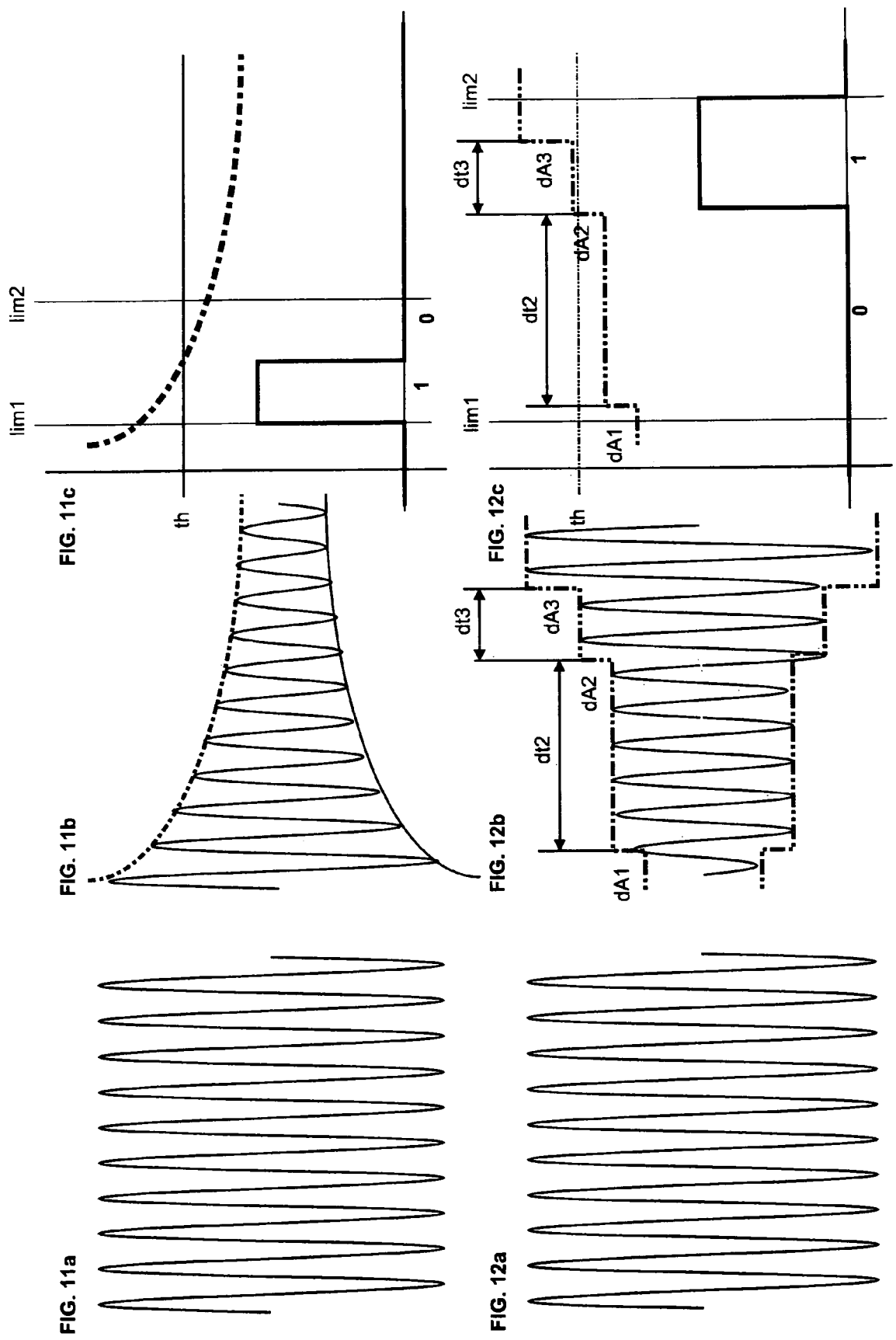

IDENTIFICATION SYSTEM AND METHOD OF DETERMINING MOTION INFORMATION

BACKGROUND

The invention relates to an identification system, and to a method of determining motion information by means of this system.

As has been described in [1], Klaus Finkenzeller, RFID-Handbook [*RFID-Handbuch*], 3$^{rd}$ Edition, Carl Hanser Verlag, Munich 2002, page 1, automatic identification methods (auto-ID) have in recent years found wide application in a variety of service sectors, such as in purchasing and distribution logistics, in commerce, in production plants, specifically, material flow systems (see e.g. [2], PHILIPS, TAGSYS, Texas Instruments Inc., White Paper, ITEM-LEVEL VISIBILITY IN THE PHARMACEUTICAL SUPPLY CHAIN, White Paper, July 2004).

Of particular significance among automatic identification systems are transponder systems in which a transponder is attached to the objects to be identified, and interrogated by a reading device using magnetic or electromagnetic fields. Since these systems normally employ radio waves, they are also designated as RFID systems. With these appropriately designed RFID systems, it is also possible to store data issued by the reading device in the transponder.

The reading device typically includes a high-frequency module (transmitter and receiver), a control unit, a coupling element, and normally an interface which enables data to be exchanged with a computer, for example, a central computer of a traffic management system or a decentralized personal computer.

The transponder, functioning as the carrier of the identification data and optionally additional data, is normally composed of a microchip and a coupling element or an antenna. For example, the identification data for a container, as well as data relating to the freight stored in the container, and optionally data relating to the state of this freight, may be stored in a transponder attached to the container (see, e.g. [3], EP 1 408 207 A1).

Outside the response range of the reading device, the transponder, which as a rule does not have its own power supply, is completely passive in function. The transponder becomes active only within the response range of the reading device. The power required to operate the transponder, as well as the clock rate and the data, are transmitted wirelessly to the transponder.

As is described in [1], pages 22-23, the most important differentiation criteria for RFID systems involve the operating frequency of the reading device, or of the reading and writing device (transceiver), the physical coupling method, and the range.

RFID systems having very short ranges of typically 1 cm, called "close coupling systems," operate using electrical and magnetic fields and frequencies of normally up to 30 MHz.

RFID systems with write/read ranges of up to around 1 m are classified by the designation "remote coupling systems" which employ almost exclusively an inductive (magnetic) coupling of reading device and transponder, and frequencies typically in the ranges 135 kHz, 13.56 MHz, or 27.125 MHz.

RFID systems with ranges above 1 m and operating frequencies in the UHF and microwave range are designated in [1] as "long-range systems."

The differing properties of the individual systems result in different areas of application. At 100 kHz, the specific absorption rate (attenuation) for water or nonconducting substances is lower by a factor of 100,000 than at 1 GHz. Low-frequency systems are thus utilized primarily due to their better penetration of objects. In transportation-engineering systems, this is a significant factor since transponder housings can often experience metal-containing contaminations or coatings from snow. On the other hand, in the case of electromagnetic systems, electromagnetic interference must be taken into account. With respect to the identification of vehicles, the required range of the RFID system must be designed such that the duration of stay within the response range is sufficient for transmission of the supplied data at the maximum speed of the vehicle.

Specifically in the case of railroad engineering, but also in connection with wider areas of transportation engineering and safety engineering, it is desirable to be able to determine not only identification data but also data relating to the movement of the carrier of a transponder, i.e., of the railroad car.

EP 1 017 577 B1, reference [4], describes a railway vehicle detector in which the direction and speed of a wheel on the railroad car is measured by two wheel-sensor-elements which are spaced relative to each other in the direction of travel and connected to one rail. Based on the field change induced by the wheel, signals are generated sequentially in the inductive wheel-sensor-elements, the evaluation of these signals supplying the desired information.

Determination of travel information by an RFID system can be effected analogously based on two receiving stations, each having one antenna, or one receiving station with two antennas. The sequential coupling of a transponder provided on a railroad car to both antennas in turn produces signals by which the required travel information can be determined. However, the use of two antennas, optionally two receiving stations, has the result that the manufacture and installation of this RFID system is relatively complex/expensive.

U.S. Pat. No. 6,046,683[5] discloses an RFID system classifiable as a "long-range system" by which travel information can be determined. In this system, an interrogator or interrogation unit sends signals to at least one transponder or ID tag which reflects a modulated response signal (backscatter signal). The interrogator then determines the frequency shift of the received signal, produced by the Doppler effect, and the corresponding speed relative to the transponder. Based on multiple measurements, the position of the transponder as well as the direction of motion of the interrogator can be determined. The implementation of this system also entails considerable complexity/expense and is feasible only on a limited basis for certain applications.

SUMMARY

The goal of the present invention is therefore to create an improved identification system comprising a stationary and mobile transmission unit, which system enables motion information of the mobile transmission unit to be determined.

Specifically, the goal is to create an inexpensively constructed and simple-to-install identification system which enables the direction of motion and/or the speed of motion and/or the acceleration of the mobile transmission unit to be determined.

This goal is achieved by an identification system and by a method intended for application within this identification system which have the features indicated in embodiments. Advantageous embodiments of the invention are described in the remaining claims.

The identification system has at least one stationary and at least one mobile transmission unit, each of which is provided with an antenna, the antennas being coupled to each other during the transmission of data.

The identification system is an RFID system having write/read ranges of a few meters, the system preferably transmitting signals by inductive or capacitive coupling.

According to the invention, at least one of the antennas is designed in such a way that in response to a mutual displacement of the inter-coupled antennas a direction-dependent modulation (amplitude modulation) of the transmitted signals is effected. In addition, a demodulation unit, optionally provided with a processor, is provided in at least one of the transmission units, by which demodulation unit the direction-dependently modulated signals are able to be demodulated, and the direction of motion and/or speed of motion and/or acceleration is able to be determined.

The term transmission unit comprises devices such as transponders or write/read units which have transmission and/or receiving units connected to a processor for data processing, which processor in turn can be connected to data processing units which serve, for example, to control equipment and/or vehicles. As long as the utilization or the appropriate arrangement of one of the antennas providing directional modulation, or of a modulation antenna, is possible, the identification system according to the invention is able to be advantageously applied in all areas in which RFID systems are used. For example, the identification system according to the invention is applicable in a transport system, a means of transportation, and/or freight conveyance system, or in a material flow system, or in a system for monitoring persons or in the corresponding equipment.

With these systems and equipment, it is often of critical importance whether a transportation means, a railway train, for example, is traveling in one or the other direction, or whether a person in a department store or an airport is passing through a gate or one-way passage into a room, or through the gate out of the room. The same applies to cargo which must flow in specified directions. It is, of course, also possible that authorization to enter or authorization to leave must be modified dynamically for certain persons or material—something which is implemented easily with the identification system according to the invention. It is also conceivable to employ identification systems as an additional security chain, or possibly to replace existing security systems.

The identification system according to the invention is of particular relevance for railroad engineering. Here information on movement is especially important not only for the central traffic control but also for the railway vehicle. In the event, for example, a car detaches from a train composition and rolls back, this fact only becomes detectable when a track section is passed in the wrong direction. Another critical aspect may be the reporting of vehicle speed, so as to be able to take appropriate measures such as switching signals, introducing speed reductions, triggering warnings, or simply recording the movements. Measuring acceleration enables the proper actions of vehicles in safety-relevant zones to be monitored, for example, at junction points.

Numerous additional possible applications exist in connection with highway traffic. For example, a determination must often be made here as to whether a vehicle is traveling through a section of road, an expressway entrance, for example, or a parking garage entrance, in the wrong direction. In addition, there exist in various European cities toll systems with control segments in which vehicles are automatically identified and charged a toll. The means according to the invention of detecting the direction of travel can also provide a simplification of the control systems in the case of these systems as well.

In addition, it can of course be extremely advantageous to be able to employ the same system to measure travel speed or even acceleration as well. If, for example, a speed limit has been specified in connection with the toll control equipment, any speed exceeding this can be captured along with the identity of the relevant vehicle.

The identification system according to the invention therefore provides in a simple manner the ability to perform the identification functions, while additionally obtaining information regarding the movement of the mobile transmission unit. An especially advantageous aspect is that the movement information can be obtained after communication by only two transmission units.

The identification system can thus be constructed simply and inexpensively, and installed at little cost. In place of, for example, two stationary transmission units, it is possible to use only one stationary transmission unit, the antenna of which will typically have somewhat larger dimensions than standard antennas.

In addition, the antenna performing directional modulation can be provided on the end with the mobile transmission unit. In addition, it is possible to couple stationary and/or the mobile transmission unit, as described in EP 04 405 780.0, with coupling devices which allow the transmission units to be interconnected over greater distances or greater response ranges, thus obtaining longer contact periods.

For example, a transponder installed on the underside of a railway car can be interrogated directly or through the coupling device by transmission and receiving devices, so-called balises which are installed in the track between the railroad rails.

Alternatively, the transponders installed on the underside of railway cars can be easily read out or written to via the appropriately installed coupling device at positions easily accessible to service personnel using a portable read and/or write device.

The coupling elements serving as antennas of the coupling device can thus be designed in an especially simple manner as modulation antennas, and employed with any desired transmission units such as transponders.

In regard to the design and/or installation of the modulation antennas, there is a high level of design-related freedom since the required transmission quality can be easily ensured. The only critical factor is simply that unique modulation patterns or signatures are obtained for each direction. A possible approach is to use simple chirp patterns, i.e., signal patterns with rising or falling amplitudes. It is especially advantageous to employ block patterns in which blocks having different amplitudes alternate.

When using signal patterns with localizable changes, these changes can be associated with the geometry of the antenna. As a result, a predetermined transfer time can be associated with the known length of an antenna segment, and thus of a traveled track section, and the speed of the mobile transmission unit calculated therefrom. If multiple antenna segments are provided, multiple speeds and corresponding speed changes or accelerations can be determined sequentially.

In a first embodiment, the modulation antenna performing directional modulation has at least one loop winding which includes a surface or a body which is asymmetrical in terms of the displacement direction. For example, the surface can have the shape of a triangle or a trapezoid which does not have any axis of symmetry running vertical to the direction of travel.

In a second embodiment, the modulation antenna has multiple loop windings, of which one or more loop windings encloses different surfaces or bodies such that symmetrical or asymmetrical surface segments or body segments adjacent to each other in the displacement direction are defined which are surrounded by different numbers of loop windings. Based on these modulation antennas, it is possible to generate patterns with localizable pattern changes.

In a third embodiment, the modulation antenna has within the loop windings different segments with materials, for example, diamagnetic, paramagnetic, or ferromagnetic materials, which have significantly different permeabilities. For example, air can be provided in the first segment, copper in a second segment, and iron in a third segment. Strongly differing flux densities are in turn produced in the region of these segments, with the result that the transmitted signals are modulated correspondingly.

In a fourth embodiment, the modulation antenna is configured, for example, as a coupling coil such a that a gradient results with respect to the coupling coefficient in the case of a mutual displacement of the antennas, according to which gradient the transmitted signals are modulated.

The procedural steps for determining the direction of motion and/or the speed of motion and/or the acceleration are easy to implement. Demodulation devices known to a person skilled in the art may be used to demodulate the modulated signals. A signal processor is preferably employed which compares the determined patterns of the demodulated signals with stored patterns. A possible approach is to use a rectifier circuit and a filter stage which supply a signal in the baseband or the envelope of the demodulated signal, which envelope is supplied, for example, to a threshold circuit which determines whether the first or the second half of the signal lies above a threshold value. The threshold value is preferably defined as a variable as a function of the amplitude response of the modulated signal.

The method can be implemented in the stationary transmission unit or in the mobile transmission unit or in both transmission units. It is also possible for the motion information to be determined only in one transmission unit, then transmitted to the second one. It is often the case that signals implementing the power supply are transmitted to the mobile transmission units, these signals having significantly higher amplitudes than the data reflected or returned to the stationary transmission unit and transmitted continuously, such that it is simpler and more accurate to obtain the motion data in the mobile transmission unit. It is of course also possible for the mobile and/or the stationary transmission unit to emit a continuous signal which is filtered out on the receiver side and evaluated. In addition, it is of course also possible appropriately to evaluate modulated response signals, for example, sequences of modulated response signals.

BRIEF DESCRIPTION OF THE DRAWINGS

The following discussion explains the invention in more detail based on the drawings:

FIG. 10 shows the expanded identification system of FIG. 4, including coupling device 4 associated with stationary transmission unit 2, where second coupling element 43 of the coupling device forms according to the invention a modulation antenna;

FIG. 11a shows an unmodulated transmission signal;

FIG. 11b shows the signal of FIG. 11a after the modulation by a modulation antenna;

FIG. 11c shows the demodulated signal of FIG. 11b and the information obtained therefrom relating to the direction of motion;

FIG. 12a shows an unmodulated transmission signal;

FIG. 12b shows the signal of FIG. 12a after modulation by a segmented modulation antenna; and FIG. 12c shows the demodulated signal of FIG. 12b and the information obtained therefrom relating to the direction of motion and the speeds of motion during different time segments;

DETAILED DESCRIPTION OF EMBODIMENTS

Figure 1:
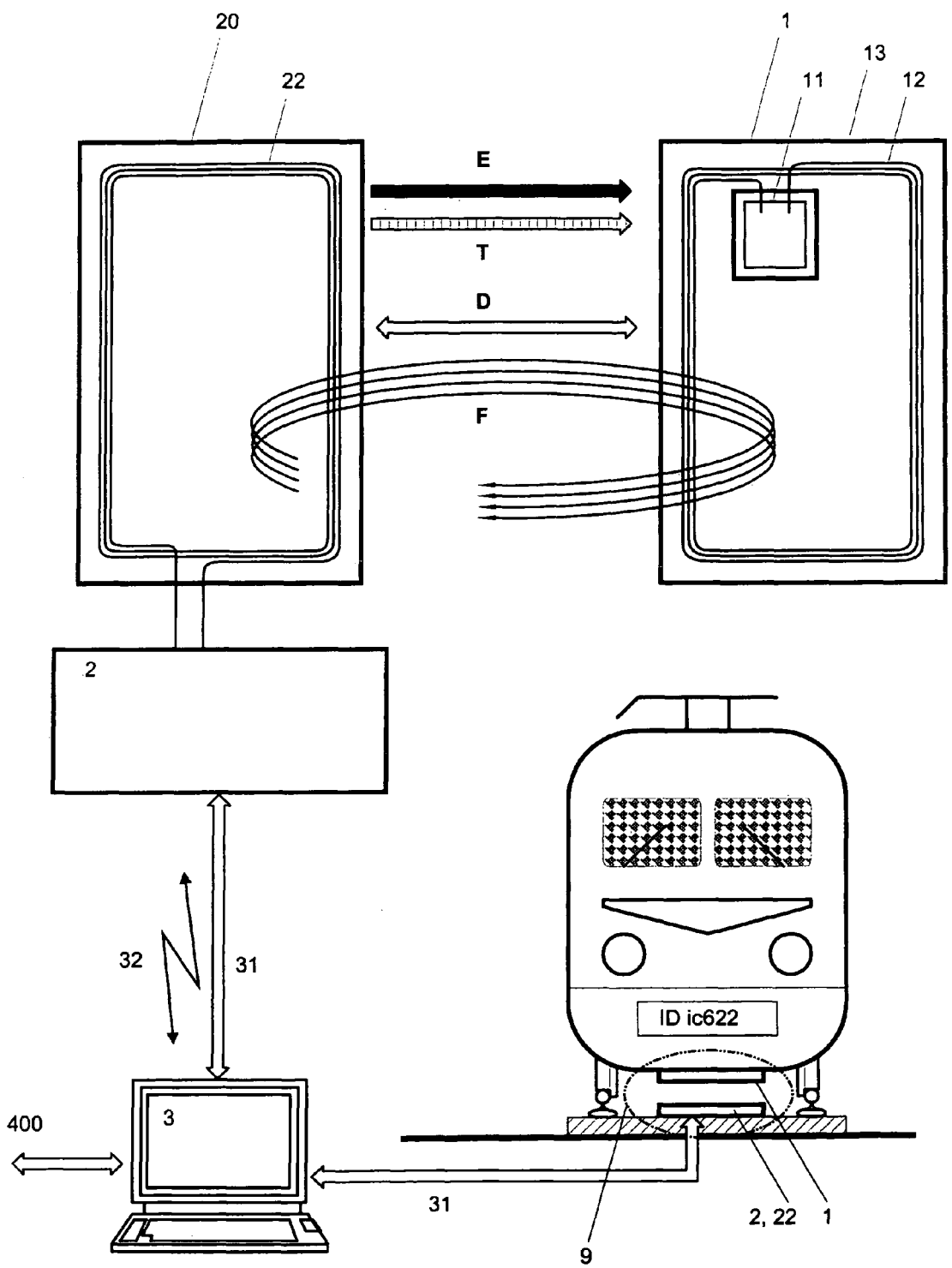
FIG. 1 is a schematic representation of an identification system employed in railroad engineering, which system has a mobile transmission unit or a transponder 1 connected to a locomotive, the transponder being connected by an antenna 12 to the antenna 22, located in a roadbed, of a stationary transmission unit or of a transceiver 2 which is connected through an appropriate interface to a computer 3.

FIG. 1 is a schematic representation of an inductive identification system which has a mobile transmission unit or transponder 1 which is connected by first antenna 12 to second antenna 22 of a stationary transmission unit or transceiver 2 which is connected to computer 3 through an appropriate wired or wireless interface 31, 32. Computer 3 is connected through connection 400 to, for example, a traffic management computer.

Transponder 1 has a chip 11 or electronic circuit located on a substrate 13, which chip or circuit contains a processor, a memory unit, and transceiver units provided with modulation and/or demodulation modules, the transceiver units being connected to coupling coil 12 acting as an antenna. Transceiver 2 which is connected to local computer 3, or additionally through a connecting line 400, for example, to a traffic management computer, has a plate-like carrier 20 on which a coupling coil acting as a second antenna is located. An alternating voltage E serving as the power supply as well as a clock signal T are transmitted by transceiver 2 to transponder 1 in order to put this into an operational state, after which data D are able to be exchanged between transponder 1 and transceiver 2. To effect inductive coupling of the two antennas 12 and 22, these are moved closely enough together that they are penetrated by magnetic field lines F.

Figure 2:
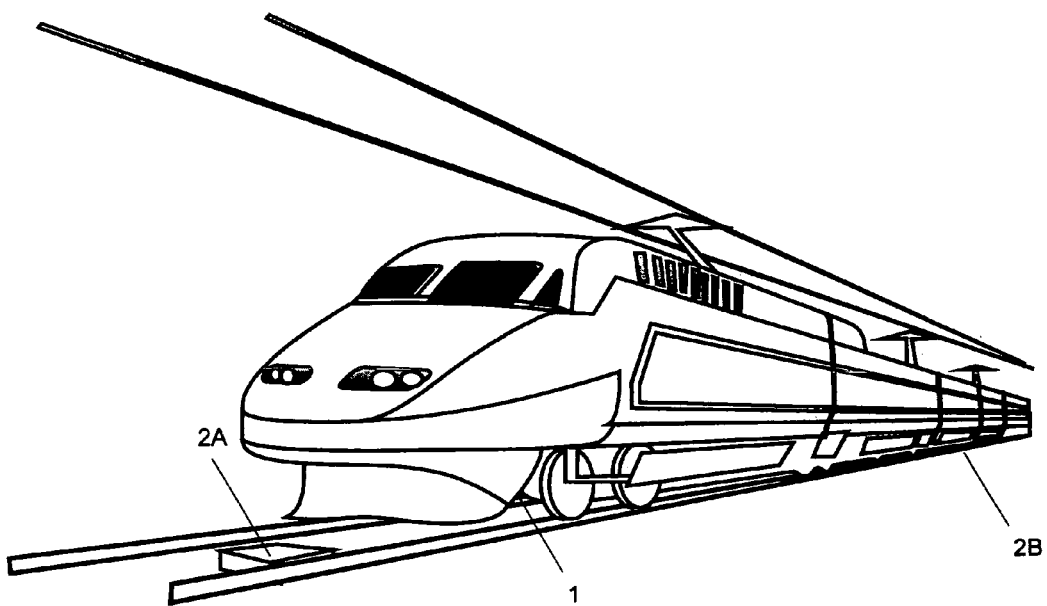
FIG. 2 shows a train composition provided with at least one transponder 1, the train composition traveling over a track section provided with two stationary transmission units 2A, 2B, or balises.

FIG. 2 shows a train composition provided with at least one transponder 1, the train composition traveling over a track section provided with two stationary transmission units 2A, 2B, or balises. If the two transmission units 2A, 2B function to monitor the direction of travel, they can be replaced by an identification system according to the invention having only one transmission unit 2.

Figure 3:
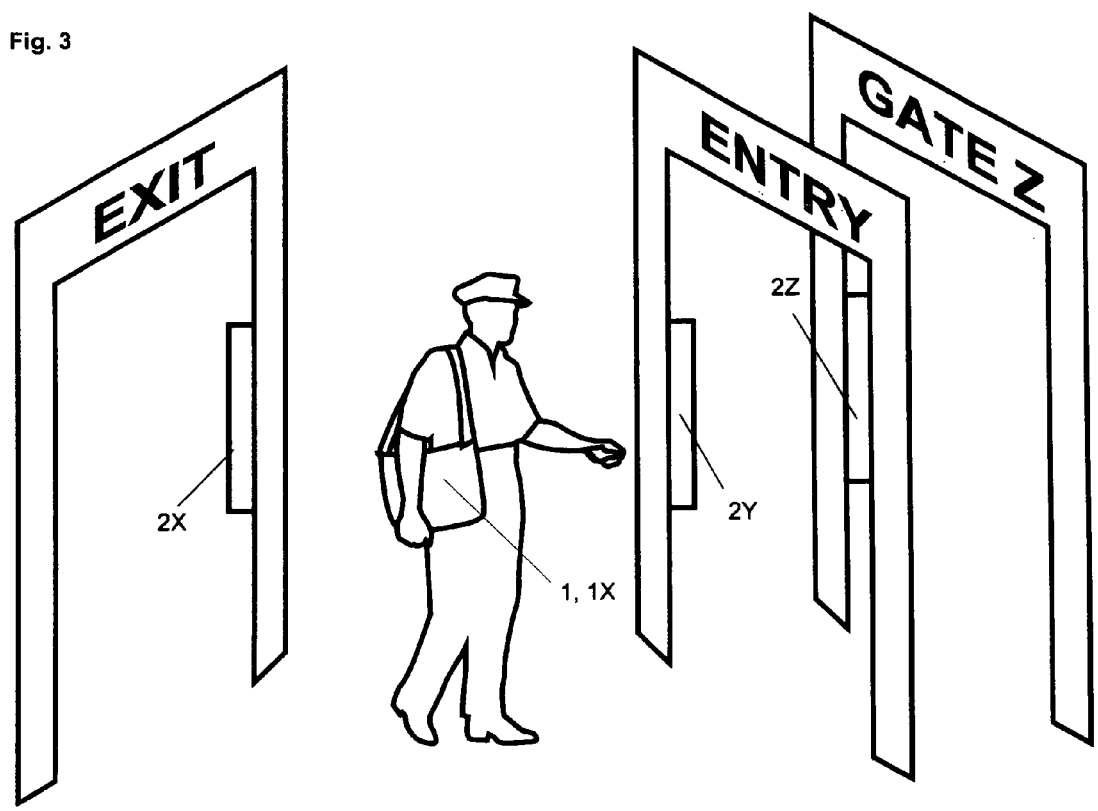
FIG. 3 shows gates or one-way doors in a secured building which is provided with stationary transmission units 2X, 2Y, 2Z.

FIG. 3 shows gates or one-way doors in a secured building, department store, warehouse, customs building, or bank which is provided with stationary transmission units 2X, 2Y, 2Z. In an optional dynamically changeable regulation approach, it can be specified that persons or goods enter the building only through the entrance and leave the building only through the exit. In addition, the specification may be made for certain persons or goods that they pass through gate Z only in one direction. Stationary transmission units 2X, 2Y, 2Z each enter into with mobile transmission units 1; 1X, for example, personal transponder 1 of a person, or transponders 1X provided on goods which approach a gate. Use of the identification system according to the invention now makes it possible not only to identify the person or the goods, but also to determine the direction in which these are passing through the one-way door. Based on the data determined, known measures can be taken—for example, signals or warnings issued, or the one-way doors can be locked if persons or goods are passing unauthorized through a gate.

Figure 4:
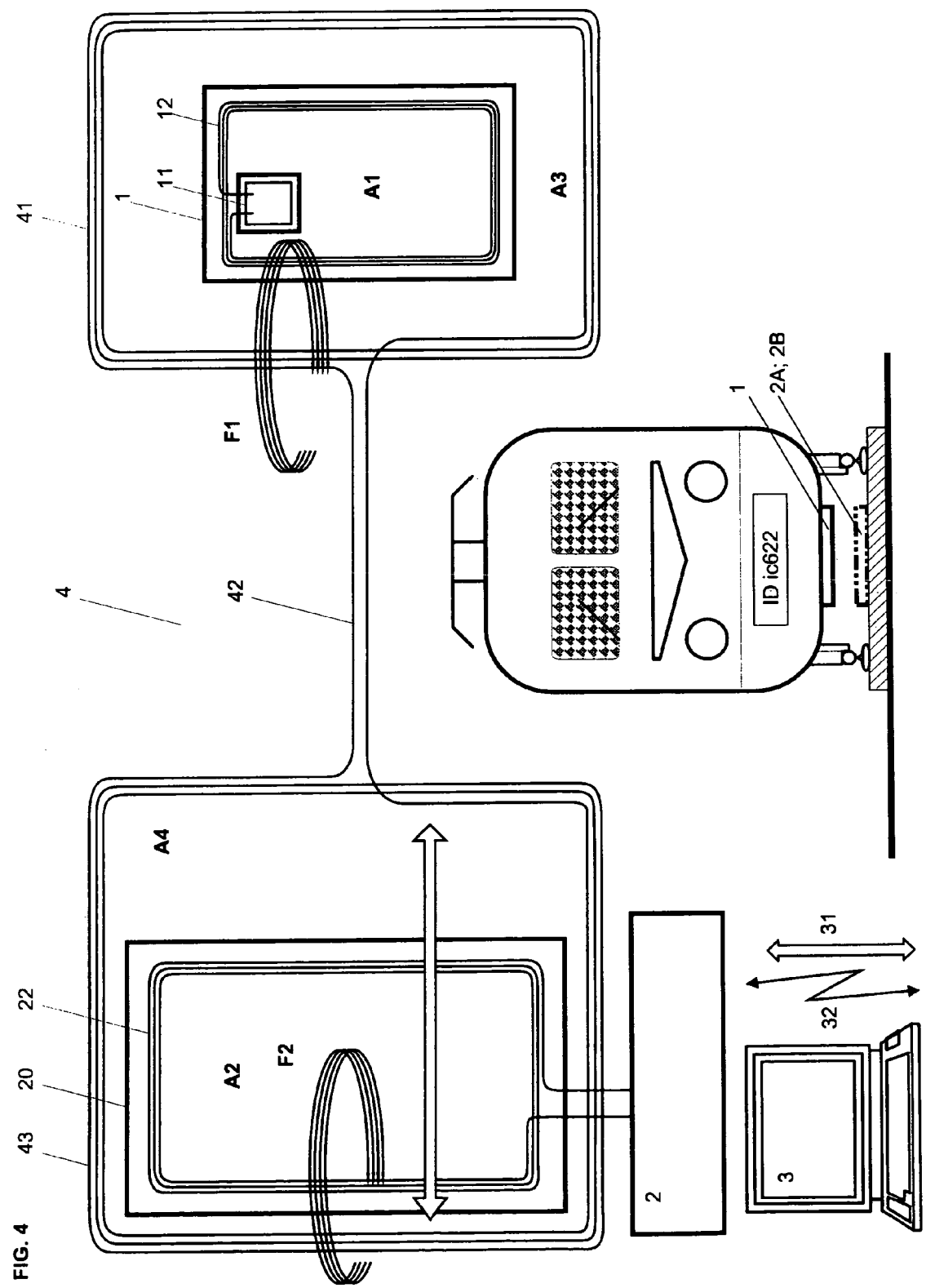
FIG. 4 shows the identification system described in EP 04 405 780.0, including a coupling device 4 associated with the stationary transmission unit or mobile transmission unit 1, 2 which has a first and a second coupling element 41, 43 which are interconnected by a third coupling element 42.

FIG. 4 shows the identification system of FIG. 1, in which transmission devices 1, 2, are coupled to each other by coupling device 4 associated with stationary or mobile transmission units 1, 2. Coupling device 4 described in EP 04 405 780.0 performs a variety of functions and has a first and second coupling element 41, 43 which are interconnected through a third coupling element 42—in this case a direct conductive connection. First, specifically by appropriately selecting the number of loop windings of coupling elements 41, 43, and taking into account the normally strongly varying transmitting powers of the two transmission devices 1, 2, the system impedances can be advantageously matched to each other, or detuned such that greater bandwidths result. First coupling element 41 can be fixedly coupled to mobile or stationary transmission units 1, 2, while second coupling element 43 serves as the antenna which is able to enter into contact with antennas 22, 12 of the corresponding stationary or mobile transmission units 2 or 1. In railroad engineering, coupling device 4 can be installed on a railroad car provided with mobile transmission unit 1 or transponder 1, or, connected to the stationary transmission unit, at least in part within the roadbed. The geometry of second coupling element 43 serving as an antenna is selected, for example, in such a way that during the mutual passage of transmission units 1, 2, the desired contact times result. Third coupling element 42 is selected so that first and second coupling elements 41, 43, can be installed at the desired positions. Second coupling element 42, by means of which first and second coupling elements 41, 43 are coupled, is preferably a coaxial cable of suitable length which is connected, for example, by plug-type connectors to coupling coils 41, 43. One coupling between first and second coupling elements 41, 43 can also be advantageously provided by one or more inductive third coupling elements 42 which are each arranged between first and second coupling elements 41, 43, such that an inductive linkage of first and second coupling elements 41, 43 is created through third coupling elements 42.

Figure 5:
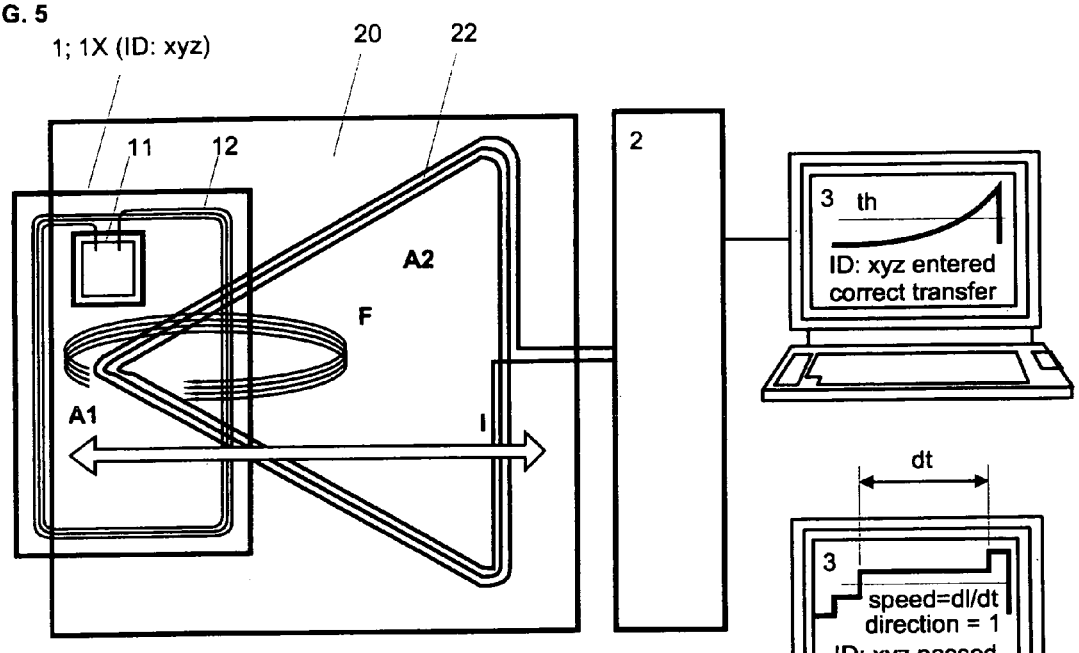
FIG. 5 shows an identification system according to the invention, including a stationary transmission unit 2 which is provided with a modulation antenna 22.

FIG. 5 shows mobile transmission unit 1 or transponder 1 during the passage of stationary transmission unit 2 which is provided with modulation antenna 22 performing the directional modulation of the transmitted signals. Transponder 1 is, for example, a personal identifier of the person shown in FIG. 3, or a transponder 1X which is connected to the transport product which is carried by the referenced person.

Modulation antenna 22 of stationary transmission unit 2 is shaped such that the coupling coefficient of antennas 12, 22 during the passage of mobile transmission unit 1 and within the contact range of transmission units 1, 2 changes such that after demodulation a signal response results having a unique pattern, in the simplest case, a gradient shape or a stepped shape. In FIG. 5, modulation antenna 22 has the shape of a triangle, one corner of which points in the direction of transport. As transponder 1 approaches modulation antenna 22, a relatively weak coupling of antennas 12, 22 results initially which subsequently rises strongly, then falls off rapidly. In order to determine the direction, it is not critical, however, which signal patterns result at a given modulation antenna 22 for each transfer direction. The important factor is simply that the resulting signal patterns each differ significantly for each transfer direction. Complex patterns are preferably evaluated using signal processors. In the case of simple patterns, on the other hand, simple threshold circuits or comparator circuits can be employed by which a determination is made as to whether a signal is rising or falling, or whether the signal power is greater in the first or second signal component.

In FIG. 5, the terminal (computer) 3 shows that transponder 1 with identification xyz has passed stationary transmission unit 2 in the permissible direction. The signal received by transponder 1 has been modulated by modulation antenna 22 in such a way that the amplitude of the signal has risen over the course of the contact time and has exceeded a threshold value th. Threshold value th is preferably generated as a function of the intensity of the received signal and can therefore change from case to case. To the extent roughly the same signal intensities occur, a constant threshold value can also be selected. This is often not the case, however, since the relative position of antennas 12, 22 can change from case to case, in particular, when transponder 1 is being carried by different people. In any case, however, it can be assumed that the relative position of antennas 12, 22 remains approximately constant during the contact time. If this is not the case and the position of the antennas is, for example, manipulated, the resulting pattern can normally not be uniquely associated with a stored direction pattern, and a warning triggered or the situational status registered.

It is important that the signal evaluation be performed only for the period in which transmission units 1, 2 have remained in contact. Preferably, limits are set before evaluation of the transmitted signals within which the signal evaluation is performed. The limits are, for example, set to the times at which the communication link between the transmission units is established and then broken off. In order to determine the threshold value, for example, a mean amplitude value can be determined within the limits. A limit can also be set at the point of maximum intensity, after which an easily evaluatable gradient results.

The directional modulation, directional demodulation, and evaluation of the signals with respect to motion information can be implemented within the identification system completely independently of the other communication operations known to a person skilled in the art. In order to obtain optimal utilization of the means employed, the individual operations are preferably handled sequentially. For example, all identification operations can be completed before the signals relating to motion information are evaluated. However, the directional demodulation and storing of the signals are preferably implemented as parallel operations.

Based on the above specifications, it is possible to design modulation antennas for the identification system according to the invention using any desired approach while taking into account the specific conditions and circumstances. An especially advantageous approach is to employ modulation antennas in which the configuration and routing of the individual conductor loops or conductor loop packages is used to form antenna segments which effect significant changes in the signal patterns.

Figure 6:
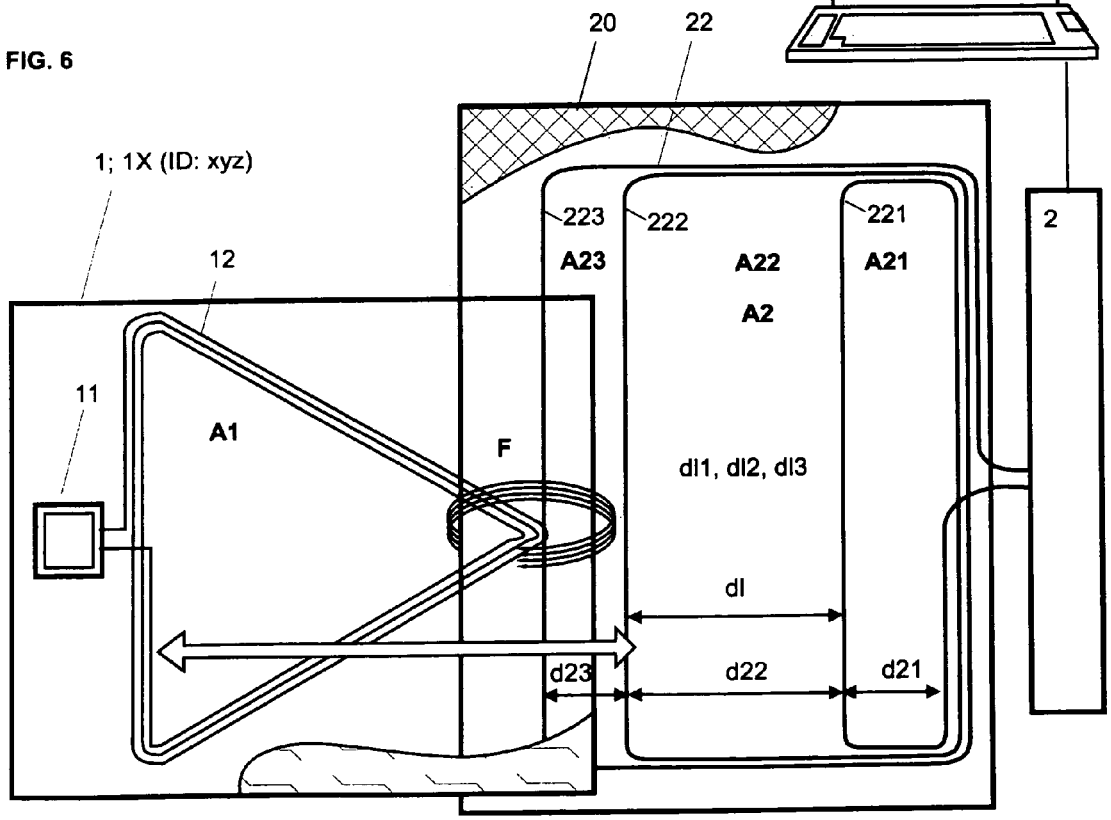
FIG. 6 shows an identification system according to the invention, including a mobile transmission unit 1 with a modulation antenna 12, and a stationary transmission unit 2 with a modulation antenna 22 which has multiple antenna segments which are formed by appropriately routing the conductor loops of antenna 22.

FIG. 6 shows modulation antenna 22 connected to stationary transmission unit 2 in which antenna first conductor loops 221 define a first antenna segment, second conductor loops 222 define a second antenna segment, and third conductor loops 223 define a third antenna segment. Here the areas A21, A22, and A23 are associated with the three antenna segments, different flux densities occurring in each of these areas. As FIG. 6 also shows, the signal is modulated in a stepped fashion so that after demodulation a corresponding signal pattern results (see FIG. 12c). The lengths of the corresponding time intervals dt1, dt2, . . . in the determined signal patterns correspond to the dimensions d12, d22, d23 of the antenna segments. The second antenna segment has the greatest dimensions d22, i.e., the greatest diameter running parallel to the direction of travel, which diameter can be advantageously used to compute the speed of motion by also determining the length dt2 of the second time interval. In addition to the direction of motion, the speed of motion can thus also be easily determined. By evaluating multiple intervals, it is thus possible to determine the speeds for multiple antenna segments, and thus the changes in speed or accelerations.

FIG. 6 further illustrates that it is also possible to provide both transmission units 1, 2 with modulation antennas 12, 22. In railroad engineering, mobile transmission units 1 are preferably provided with modulation antennas 12, 43 (see FIG. 9) so that the stationary transmission units 2 can be installed at minimum expense "at specific points."

Figure 7:
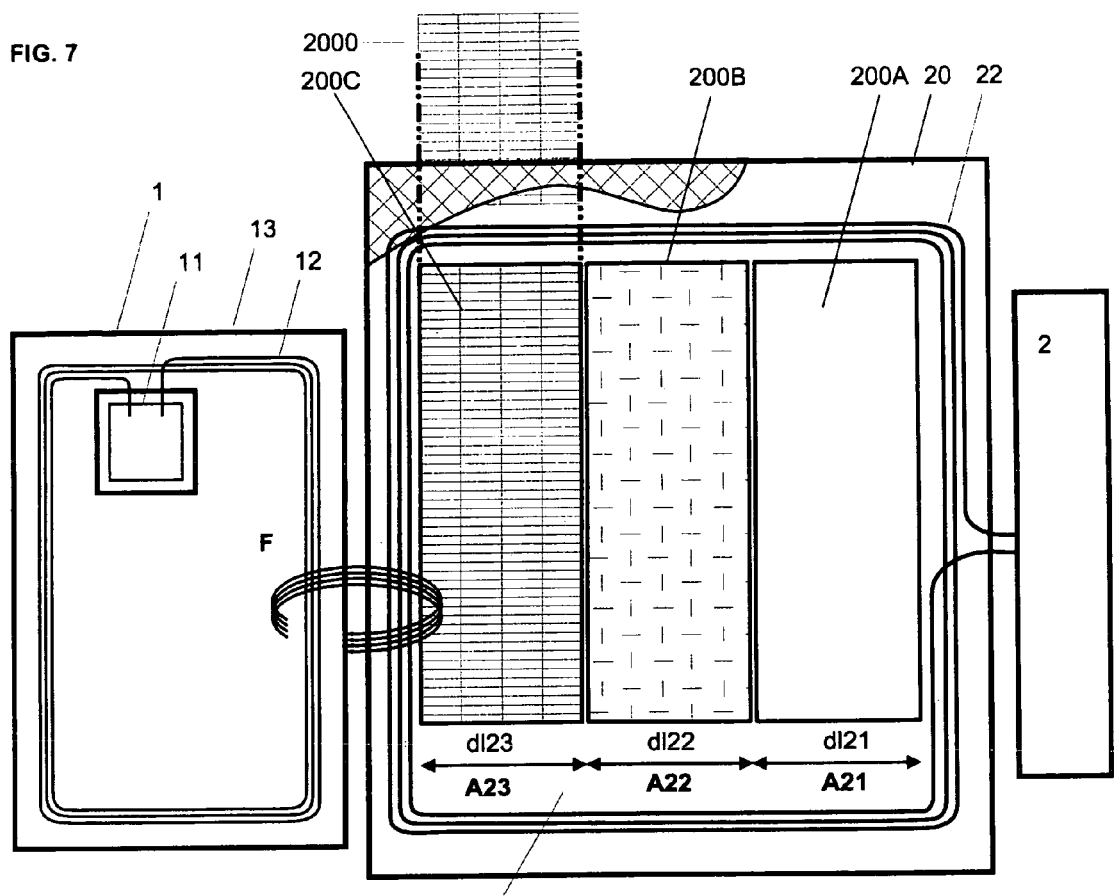
FIG. 7 shows an identification system according to the invention, including a mobile transmission unit 1 and including a stationary transmission unit 2 with a modulation antenna 22 which has multiple antenna segments which are formed by the embedding of material segments having different permeabilities, or by the embedding of material segments of identical permeability having different densities.

FIG. 7 shows modulation antenna 22 connected to stationary transmission unit 2, in which antenna the area A enclosed by the conductor loops is divided into three segments A21, A22, A23 which have diameters d121, d122, d123 in the direction of travel, and in which material segments 200A, 200B, 200C are provided which have different relative permeabilities. For example, air can be provided in a first segment, copper in a second segment, and iron in a third segment. Modulation antennas (12), 22 can be installed precisely adjacent to known components and materials which function as material segment 2000. For example, modulation antenna 22 can be installed in the roadbed over metal ties in such a way that a unique modulation pattern results for each direction of travel. For example, a metal tie 2000 is provided at the beginning of the antenna loops, while no metal tie 2000 is provided at the end of the antenna loops. Strongly varying flux densities thus result in the range of these segments, as a result of which the transmitted signals are modulated correspondingly. It is especially easy to fabricate modulation antennas of this type which have a high degree of modulation.

Modulation antennas (12), 22 can be installed precisely adjacent to known components and materials which function as material segment 200. For example, modulation antenna 22 can be installed in the roadbed over metal ties in such a way that a unique modulation pattern results for each direction of travel. For example, a metal tie 2000 is provided at the beginning of the antenna loops, while no metal tie 2000 is provided at the end of the antenna loops. The antenna can also be attached inside a building in the region of concrete elements or metal door frames.

It is also possible to use material segments composed of elements of identical permeability which are arranged having different densities in the area segments, again with the effect that different flux densities and corresponding modulation patterns result.

What is important is that with modulation antennas better coupling can result by embedding material segments in all antenna segments than is the case for antennas which are not used for directional modulation.

Figure 8:
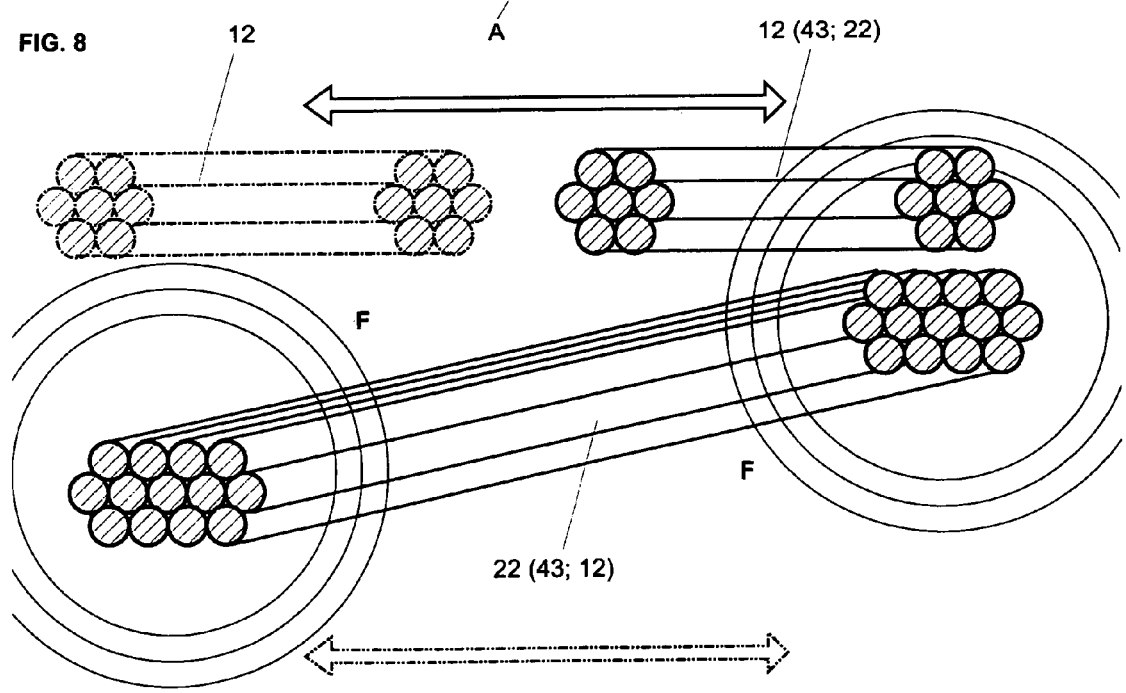
FIG. 8 shows in simplified form an embodiment of a loop antenna acting as a modulation antenna 12, 22, or 43, the loop antenna being installed obliquely such that a coupling gradient is produced when the antenna systems are displaced.

FIG. 8 shows loop antenna 22, functioning as a modulation antenna, of stationary transmission unit 2 which is installed obliquely relative to the direction of motion of antenna 12 of mobile transmission unit 1. The degree of modulation between these antennas 12, 22 thus changes in response to their mutual displacement, thereby also producing a modulation of the transmitted signals here as well.

Figure 9:
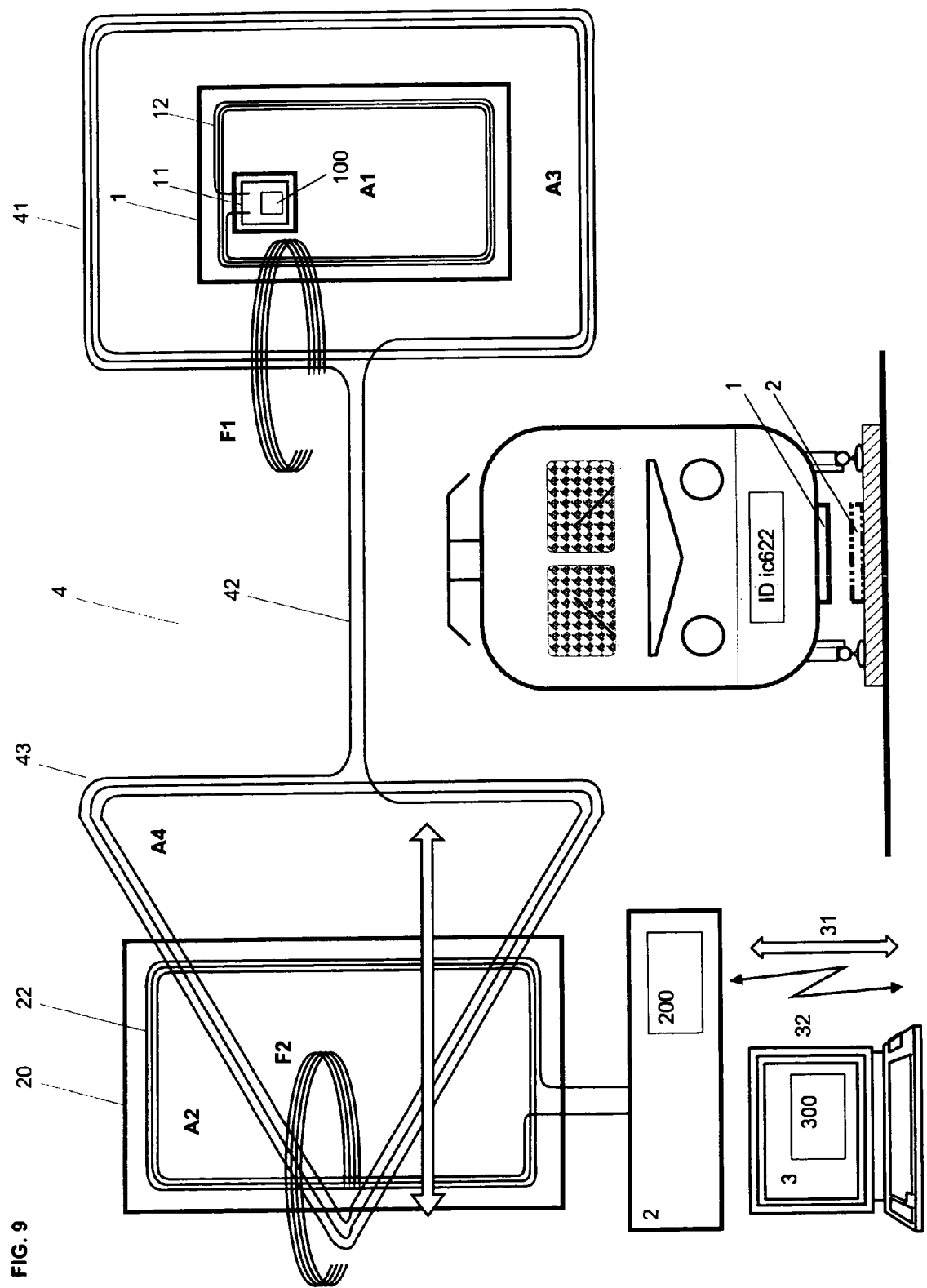
FIG. 9 shows the expanded identification system according to the invention of FIG. 4, including a coupling device 4 associated with mobile transmission unit 1, where second coupling element 43 of the coupling device forms according to the invention a modulation antenna.

FIG. 9 shows the identification system according to the invention of FIG. 4, including coupling device 4 associated with mobile transmission unit 1, the second coupling element 43 forming a modulation antenna according to the invention. When something travels over a "point-specific" second transmission unit 2, directional modulation of the transmitted signals is thus effected by modulation antenna 43 which is installed, for example, on the underside of a locomotive. Evaluation of the transmitted signals can be effected in the mobile and/or stationary transmission unit 1, 2. The information can be obtained simply and accurately within mobile transmission unit 1 since signals of high intensity are transmitted by transmission unit 1. The use of the signal providing the power supply is especially simple, the signal being rectified within the transponder in any case. The rectified signal can be supplied, for example, through an R-C element to a signal processor or a comparator circuit. An especially advantageous aspect is that the motion information precisely determined in the mobile transmission unit can still be signaled within the contact period to stationary transmission unit 2. In this application, for example, modulation antennas can be provided in which a modulation component is enclosed by antenna components not implementing the modulation. The above-referenced limits which delimit the signal component to be evaluated must then be set more closely accordingly. Provision must be made in the transmission protocol that the transmission of motion information is also provided in addition to the transmission of identification data.

FIG. 10 shows the identification system expanded according to the invention of FIG. 4, including coupling device 4 associated with stationary transmission unit 2, second coupling element 43 of this device forming a modulation antenna according to the invention.

FIG. 11a and FIG. 12a show a signal, for example, a signal implementing the power supply (see FIG. 1, signal E) before modulation. FIGS. 11b and 11c show the signal after modulation by modulation antenna 21 and/or 22. Signal 12b has been modulated by a segmented modulation antenna, as illustrated in FIG. 6. FIGS. 11c and 12c show the demodulated and filtered signals which are evaluated within limits lim1, lim2.

In FIG. 11c, a threshold value th is provided which is compared with the demodulated signal within the limits lim1, lim2, thereby obtaining the desired directional information.

A threshold value th is also applicable in FIG. 12c, this value being compared to the demodulated signal within limits lim1, lim2. In both cases, however, one threshold value th can be eliminated by comparing the determined signal pattern with a stored signal pattern which has been determined, for example, from tests.

Also plotted in 12c are the lengths of the intervals which correspond to dimensions d1 of the corresponding antenna segments of FIG. 6 and which the train has needed to cover a corresponding stretch of track. Intervals dt are each delimited by significant amplitude changes dA1, dA2, dA3.

All signals transmitted between transmission units 1, 2 can be used for modulation and evaluation. In addition, it is also possible to use one signal intended only for this purpose. An especially advantageous approach is to use signal E implementing the power supply (see FIG. 1).

Figure 13:
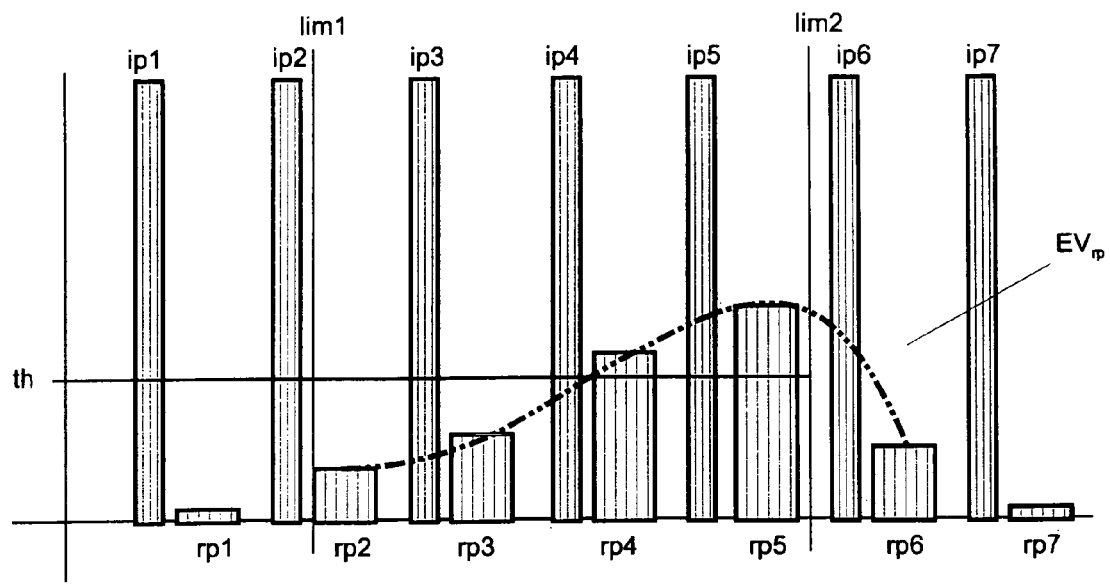
FIG. 13 shows a sequence of interrogation pulses ip not yet modulated according to the invention and response pulses rp modulated according to the invention.

FIG. 13 shows a sequence of interrogation pulses not yet modulated according to the invention ip1, ip2, . . . , and response pulses modulated according to the invention rp1, rp2, . . . , by which the interrogations are answered. It is fundamentally possible, for example, for transponder 1, after receiving an interrogation pulse ip, to send a long sequence of response pulses rp11, rp12, . . . . In addition, it is possible for multiple transponders 1, 1X, 1X' (see FIG. 10) to send response signals rp which are preferably evaluated after generating a summation signal.

Figure 14:
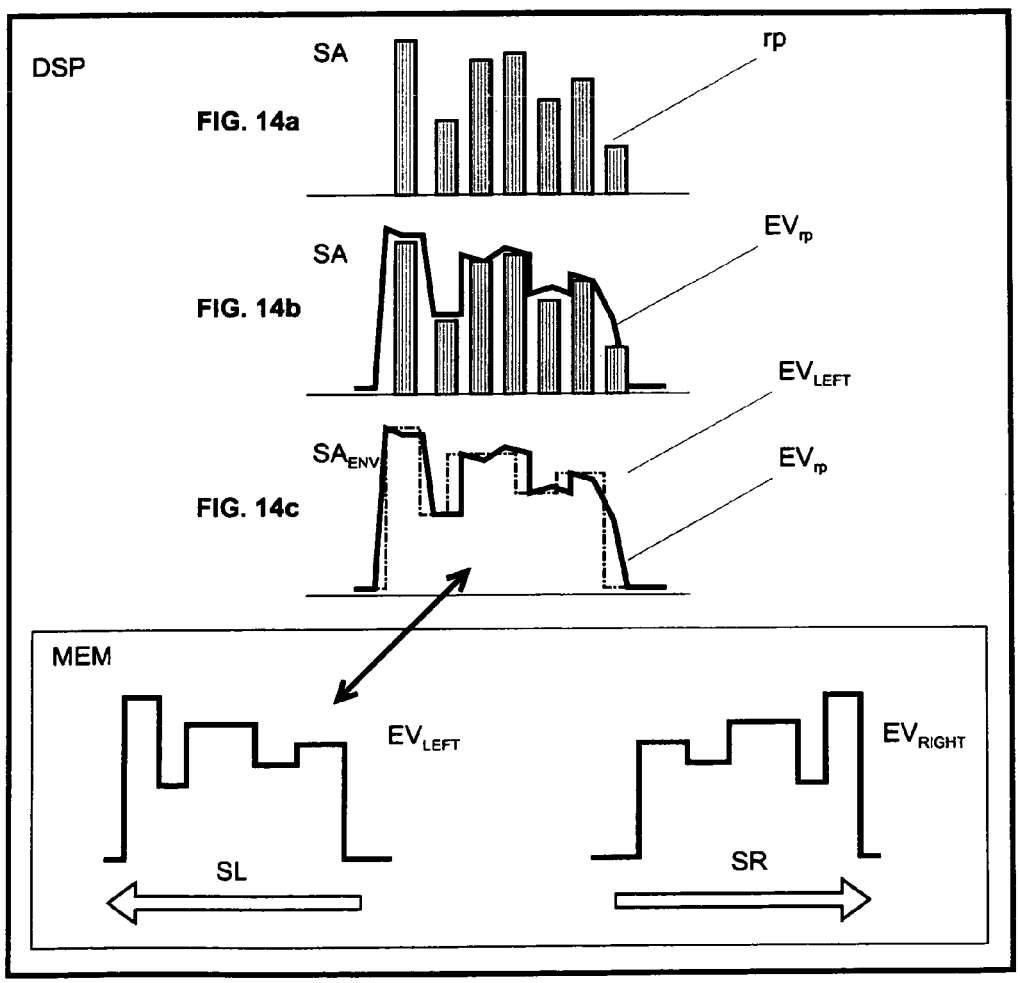
FIG. 14 shows snapshots of the operations within a signal processor during the processing and evaluation of processed signals before and after demodulation and evaluation.

FIG. 14 shows snapshots of the operations in a signal processor DSP during the processing and evaluation of response pulses rp1, rp2k, . . . , before and after demodulation and evaluation. FIG. 14a shows the modulated response pulses rp. FIG. 14b shows the modulated response pulses rp and an envelope $EV_{rp}$ generated by the demodulation operations. FIG. 14c shows envelope $EV_{rp}$ or a signal pattern or a signature which has been generated during the passage in one direction. After determination of the signal pattern as indicated in FIG. 14c, the comparison is implemented with signal patterns $EV_{LEFT}$, $EV_{RIGHT}$ stored in memory MEM which have been determined by means of test runs for each direction of travel.

The identification system according to the invention has been described and presented in preferred embodiments. However, based on the teaching according to the invention it is also possible to realize other embodiments using the technology known to a person skilled in the art. In particular, based on the teaching according to the invention, the person skilled in the art can provide modulation antennas adapted to a given application. In addition, any evaluation circuits may be employed based on analog or digital circuit logic. In the event processor are used, specifically, signal processors, the evaluation can be implemented by software.

The identification system according to the invention is not limited to the use of inductive or magnetic signal transmission. The invention can be applied analogously for signal transmission by means of electrical fields, for example, based on capacitively operating antennas. In the case of capacitive coupling, for example, capacitively coupled antennas can be provided, the spacing of which changes during mutual displacement. In the simplest case, a capacitor plate is provided oriented obliquely relative to the direction of travel over and beyond which a capacitor plate parallel to the direction of travel is passed. The antenna segments of these antennas can also be achieved easily using a segment-by-segment coating with different dielectrics, and/or by the appropriate selection of the sizes of the antenna segments.

The signal processors required in transmission units 1, 2, and demodulation stages 100, 200, 300, can be selected, configured, and/or programmed by the person skilled in the art as required for the specific case.

In addition to the modulations by the modulation antennas, the transmitted signals can also be amplitude-modulated in the transmission stage of the stationary and/or mobile transmission unit 1, 2, in order to simulate a modulation antenna, for example, for calibration purposes, or, for example, when employing passive transponders 1, in order to compensate the modulation by the modulation antenna at least in one direction. To the extent the transmission direction is already known, the modulation can also be compensated in both directions in order to achieve optimal transmission conditions.

LITERATURE

[1] Klaus Finkenzeller, RFID-Handbuch, $3^{rd}$ Edition, Carl Hanser Verlag, Munich 2002.
[2] PHILIPS, TAGSYS, Texas Instruments Inc., White Paper, ITEM-LEVEL VISIBILITY IN THE PHARMACEUTICAL SUPPLY CHAIN, White Paper, July 2004
[3] EP 1 408 207 A1
[4] EP1017577 B1
[5] U.S. Pat. No. 6,046,683

What is claimed is:

1. An identification system, in particular, for a transport system, a means of transportation, and/or a freight conveyance system, or to monitor persons, comprising at least one stationary and at least one mobile transmission unit which are each provided with an antenna which during the transmission of data are coupled to each other inductively or by an electric field, wherein:
at least one of the antennas is designed or arranged such that during mutual displacement of the coupled antennas a directionally dependent modulation of the transmitted signals occurs, in at least one of the transmission units a demodulation unit, optionally provided with a processor, is provided by which the direction-dependently modulated signals are able to be demodulated, and the direction of motion and/or speed of motion and/or acceleration is able to be determined, the stationary transmission unit and the mobile transmission unit are structured such that, while the antennas are coupled and during the mutual displacement of the coupled antennas, signals are transmitted from the stationary to the mobile transmission unit, or the signals are transmitted from the mobile to the stationary transmission unit, the signals are direction-dependently modulated by at least one of the antennas, and the signals are demodulated in one of the mobile transmission unit or the stationary transmission unit that received the signals, after which the direction of motion and/or speed of motion is able to be determined based on the demodulated signals, and the identification system is structured such that the demodulated signals are compared with signal patterns which are characteristic of the directions of motion, or at least one fixed threshold value is provided, or based on the received signals at least one variable threshold value is generated that is used to determine whether the first or second signal half lies above the threshold value.

2. The identification system according to claim 1, wherein the at least one antenna has at least one loop winding which encloses a surface or a body which has no axis of symmetry running vertically to the direction of travel, or that the at least one antenna is installed such that it does not have an axis of symmetry running vertically to the direction of travel, or that the at least one antenna has multiple antenna segments which have differing coupling properties.

3. The identification system according to claim 2, wherein the at least one antenna has multiple loop windings, of which one or more loop windings enclose different areas or bodies such that symmetrical or asymmetrical surface segments or body segments lying adjacent in the direction of displacement are defined which are enclosed by different numbers of loop windings, and/or the antenna area enclosed by loop windings is divided into areas, in or on which materials of differing permeability are located.

4. The identification system according to claim 2, wherein the surface has the shape of a triangle or trapezoid, and/or that the antenna is installed obliquely relative to the direction of motion, and/or that materials of different permeability and/or materials of identical permeability and different density are located in areas.

5. The identification system according to claim 1, wherein one or more antenna segments are provided with fixedly defined diameters, based on which the speed or acceleration can be determined.

6. The identification system according to claim 1, wherein a coupling device is provided with a loop-shaped first and with a loop-shaped second coupling element which are coupled to each other by at least one conductive or inductive third coupling element, and of which the first coupling element is inductively coupled to a coupling element of the stationary or the mobile transmission unit, and of which the second coupling element serves as an antenna of the given stationary or mobile transmission unit and serves only to effect transmission of signals, or transmission and direction-dependent modulation of signals.

7. A method of operating the identification system according to claim 1, wherein the modulation is implemented by appropriately shaped, appropriately installed, or segmented modulation antennas.

8. A method of operating the identification system according to claim 7, wherein one or more antenna segments are provided with fixedly defined diameters for which, preferably based on significant changes in amplitude, corresponding intervals are determined in a signal pattern, the speed and/or acceleration being determined therefrom.

9. A method of operating the identification system according to claim 1, wherein signals implementing information transfer or power supply are demodulated in order to determine the directional information and/or speed information.

10. A method of operating the identification system according to claim 1, wherein directional information and/or speed information is obtained in the mobile transmission unit and transmitted to the stationary transmission unit.

11. A method of operating the identification system according to claim 1, wherein after determination of motion information, control devices implementing traffic management are actuated, and/or the signals, reports or warnings are issued.

12. A method of operating the identification system according to claim 1, wherein signal transmission is implemented inductively or capacitively.

* * * * *